J. COFFEEN.
PROCESS OF EXTRACTING SULFUR FROM ORE.
APPLICATION FILED MAY 24, 1919.
1,314,856.
Patented Sept. 2, 1919.
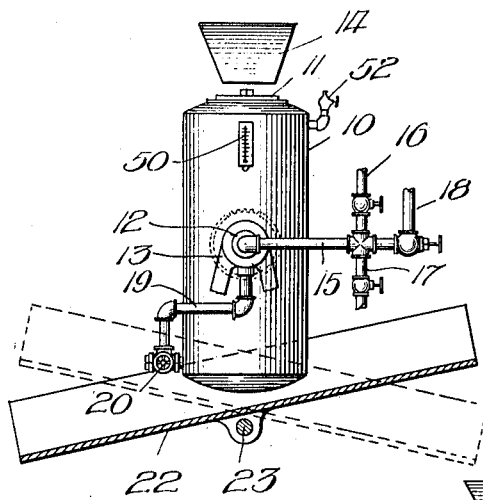
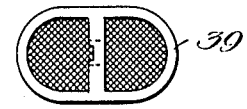
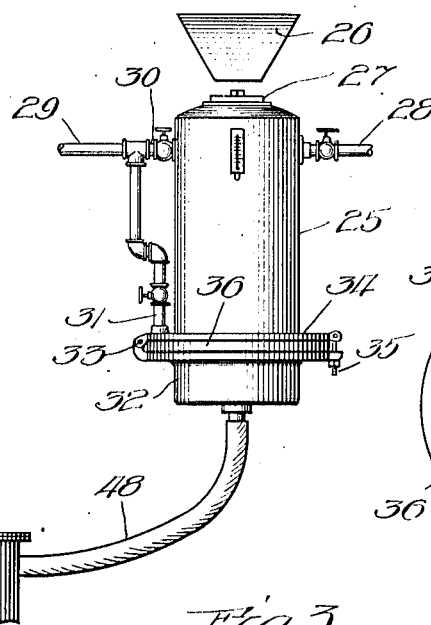
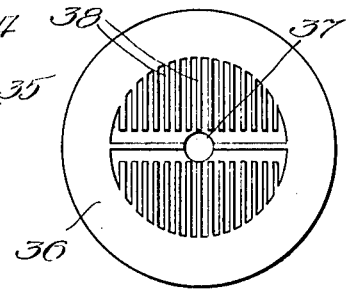
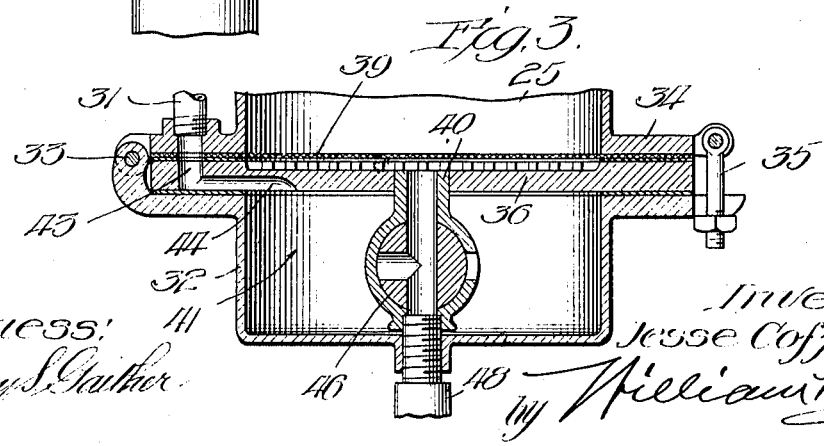
Witness:
Harry S. Gauther
Inventor:
Jesse Coffeen
by William H. Ave
Atty

UNITED STATES PATENT OFFICE.

JESSE COFFEEN, OF CHICAGO, ILLINOIS, ASSIGNOR TO IGNATIUS BRADY, OF CHICAGO, ILLINOIS.

PROCESS OF EXTRACTING SULFUR FROM ORE.

1,314,856.   Specification of Letters Patent.   Patented Sept. 2, 1919.

Application filed May 24, 1919. Serial No. 299,462.

*To all whom it may concern:*

Be it known that I, JESSE COFFEEN, a citizen of the United States, and a resident of Chicago, in the county of Cook and State of Illinois, have invented certain new and useful Improvements in Processes of Extracting Sulfur from Ore; and I do hereby declare that the following is a full, clear, and exact description thereof, reference being had to the accompanying drawings, and to the characters of reference marked thereon, which form a part of this specification.

This invention relates to improvements in process of extracting sulfur from ore, and refers more particularly to a process adapted to extract or recover sulfur from ore with a minimum ultimate amount of foreign material, such as mud found in the raw ore, so as to thereby produce a product relatively free from foreign matter.

The invention has for its purpose to simplify the process of recovering sulfur from ore, both in respect of the steps involved in the process pursued, and to also lessen the cost of the work of recovering sulfur from ore.

In practising my novel process, the raw ore is subjected to heat to melt or fuse the sulfur and to soften the mud or other foreign substance of the ore, and thereafter the ore mass is allowed to cool below the solidifying or freezing temperature of the sulfur. Thereafter the cooled ore mass is subjected to a washing or flushing operation of water or other medium at a temperature below the melting temperature of the sulfur for the purpose of washing the mud and other foreign substances from the sulfur and ore rock. The resultant ore mass is thereafter reheated for the purpose of again liquefying the sulfur, after which the sulfur is separated or recovered from the ore rock as a product, which may thereafter be subjected to a further refining process if desired.

The raw ore mass is preferably subjected to a moisture heat under pressure for the purpose of melting the sulfur to separate it from the ore rock and to soften the mud, and when the ore mass is allowed to cool below the solidifying or freezing temperature of the sulfur, the mass is subjected to the application of a washing fluid, as water under atmospheric pressure to remove the softened mud from the cooled sulfur and ore rock.

The sulfur may be recovered from the ore rock in the same compartment in which it is subjected to the digesting or heating process, or the ore rock and sulfur, freed from the mud, may be transferred to a second separator compartment or chamber where the sulfur may be recovered from the ore rock by the application of sufficient heat, and preferably under pressure, to liquefy the sulfur, the liquefied sulfur and the ore rock being separately removed from the separating chamber.

The process may be practised by any suitable form of apparatus capable of successively carrying out the steps enumerated. I have herein shown one practical form of apparatus for this purpose and the same will hereinafter be described in detail, but it is to be understood that the apparatus may be considerably varied within the spirit and scope of the invention, and that the invention is not limited to the detailed disclosure herein, except as to claims specifically limited thereto, and as imposed by the prior art.

In the drawings,

Figure 1 is a diagrammatic view of an apparatus suitable for practising my improved process.

Fig. 2 is a plan view of a screen to be applied to the digester through which the mud is washed from the ore.

Fig. 3 is a fragmentary detail of the lower end of the separating chamber in which the melted sulfur is adapted to be separated from the ore rock.

Fig. 4 is a support for the screen at the bottom of the separator chamber.

As shown in said drawing, 10 designates an elongated digester chamber or tank which is closed at one end and is provided at its other end with a charging and discharging opening that is adapted to be closed by a cover 11. The said digester 10 is adapted to be rotated on a transverse axis located centrally between its ends, it being provided with bearing trunnions 12 that are supported in suitable fixed brackets 13, one of which is shown in Fig. 1. Said digester may be rotated by power applied thereto from any suitable source, as from the gear wheel indicated in Fig. 1. 14 designates a hopper located centrally over the digester through which the raw ore is adapted to be charged into the digester when the closure 11 is removed. 15 designates a pipe which is disposed axially of one of said trunnions 12 and is adapted to be connected, exterior to the trunnions bearing with a valved hot water pipe 16, a valved cold water pipe 17, and a valved steam pipe 18. The pipe 15 is provided with a branch pipe 19 that is connected to the digester near one end thereof to admit materials to the digester from the several pipes 16, 17, and 18, as hereinafter described, and said pipe 19 is provided with a controlling valve 20.

Located below said digester is a chute 22 upon which the contents of the digester are adapted to be discharged and by which said contents are carried away from the digester. The said chute is herein shown as constituting a double-ended structure and is pivoted at its center by means of a pivot stud 23 located at or near the vertical axis of the digester so that the ends of the chute may be inclined downwardly and oppositely from its center in either direction, as will hereinafter more fully appear. The said chute constitutes a conveyer for conveying from the digester mud discharged therefrom in the washing operation, and thereafter for conveying from the digester the sulfur and ore rock which remains after the mud has been washed therefrom, the chute being inclined in one direction to carry the mud away from the digester and in the other direction to carry the sulfur and ore rock to the separator tank or chamber hereinafter to be described.

So far as the broader features of the invention are concerned, however, the said chute constitutes a conveyer and may be otherwise constructed for the purpose described.

25 designates a separator chamber which, as shown, is located at one side of and below the digester, and into which one end of the chute 22 discharges when inclined in one direction. The material is discharged from said chute into a hopper 26 that is located over an opening in the separator chamber 25 which is normally closed by a removable cover 27. 28 designates a valved hot water pipe that leads to the separator tank or chamber 25, and 29 designates a steam pipe that is provided with two valved branches 30, 31, the former leading into the separator chamber near its top, and the latter leading into the bottom structure of the separator chamber in the manner best shown in Fig. 3. As therein shown, the lower end of the separator chamber is closed by a swinging door 32 that is hinged at 33 to a flange 34 at the lower end of the separator chamber and is adapted to be locked in its closed position by the swinging locking bolt 35. Carried by said swinging door or forming a part thereof is a plate 36 that is provided with a central opening 37 and around said opening with a ribbed top surface 38 to constitute a support for a screen or strainer 39 that extends entirely across the lower end of the separator chamber. The screen may be a wire screen, a fabric screen, or a combination of both. Connected to said opening 37 is a fitting 40, an extension of which extends centrally through an opening in the swinging door 32.

The said plate 36 and the door are spaced to provide therebetween an inclosed steam chamber 41 which surrounds the fitting 40. The branch 31 of the steam pipe extends through the flange 34 of the separator chamber wall and is adapted, when the swinging door is closed, to register with a passage or duct 43 formed in the plate 36 and communicating through a by-pass 44 with said steam chamber 41. A packing gasket is interposed between the plate 36 and the flange 34 of the separator wall and said gasket is apertured in line with the branch pipe 31 and with the duct 43 so as to afford a steam tight joint between the pipe 31 and said duct when the door is closed.

The fitting 40 is provided with a three-way valve 46 which is adapted in one adjustment to afford a thoroughfare through the fitting for the discharge of material from the separator chamber 25 and is adapted, in another adjustment, to afford communication between the steam chamber 41 and the separator chamber through the fitting 40 and the screen 39 so as to permit steam to be forced upwardly through said screen and through the ore mass supported thereon.

The fitting 40 is adapted to be connected by a flexible pipe 48 to a chamber 49, or other suitable place of disposal for the material from the separator chamber. Said chamber 49 may constitute a refining chamber for the sulfur to extract further foreign substances therefrom.

In the operation of the apparatus as shown for carrying out my novel process, the raw ore is charged into the digester 10 through the hopper 14 to about one half the capacity of the digester. Thereafter the manhole cover or closure 11 is clamped over the charging opening to close the digester against internal pressure. Thereafter hot water at a temperature of about 255 or 260 degrees F. is charged into the digester through the pipes 16 and 15 the valve in said pipe 16 being at this time open. The digester is now slowly rotated by power applied thereto in any suitable manner, and in order to maintain the temperature and pressure in the digester at the proper point, steam is admitted as required through the pipes 18 and 15, the valve of the pipe 16, having been theretofore closed. A thermometer 50 is connected to the digester chamber to show the internal temperature to enable the operator to properly supply steam thereto to maintain the desired temperature and pressure. The steam is admitted to the digester chamber at a temperature of about twenty pounds to the square inch to maintain the temperature of the water from about 255 to 260 degrees F. The digesting process is continued for about ten minutes or for the time required to dissolve the sulfur from the ore and to soften the mud. Thereafter steam is disconnected from the digester and rotation is continued and the digested ore mass allowed to cool to a temperature below the freezing or solidifying temperature of the sulfur. During this continued rotation the pressure in the digester chamber is equalized with atmospheric pressure through a relief pipe 52. Thereafter the manhole cover or closure 11 is removed from over the charging and discharging opening of the digester and a screen 39 shown in Fig. 2 is applied to said opening and locked thereto by any suitable form of crab. Thereafter the digester is again slowly rotated and water is admitted thereto by the pipe 17 at a temperature below the melting point of the sulfur. As the digester continues to rotate the cooler water circulates through the ore mass and flows out of the charging and discharging opening when the end of the digester containing said opening is in the lower part of its arc of travel, carrying the softened mud with it, the water and mud falling onto the chute 22 which is at this time inclined in the direction shown in full lines in Fig. 1, so that said water and mud are carried away from the apparatus to any suitable point of disposal therefor.

After the ore mass has been thoroughly washed, the washing water pipe 17 is closed and the digester is turned to bring the charging and discharging opening at the lower end of the digester in position to discharge upon the chute 22. The angle of the chute at this time is reversed to cause it to discharge into the hopper 26. Thereafter the screen is removed from the charging and discharging opening of the digester so as to allow the residual ore mass, consisting of sulfur and ore rock, to fall onto the inclined chute and to be discharged into the hopper 26 and into the charging opening of the separator chamber 25, the closure at this time having been removed. Thereafter the said closure 27 is clamped over the charging opening of the chamber 25 and the water pipe 28 is opened to admit water at a temperature higher than the melting temperature of sulfur, the branch steam pipe 31 having been before opened to admit steam into the separator chamber to heat the mass. The contents of the separator chamber may, if desired, be agitated while treated with the hot water and steam. The effect of the hot water and the steam, which is designed to maintain the temperature of the water above the melting point of the sulfur, is to melt or liquefy the sulfur so that it may be separated from the ore rock. At this time it will be understood that the valve 46 is adjusted to allow steam to pass from the branch pipe 31 upwardly through the screen 39 and through the ore mass resting thereon. It may be stated, in passing, that the steam pipe 31 is always open to the chamber 41 so as to maintain the plate 36 heated to prevent freezing or solidifying of the sulfur at the lower portion of the ore mass.

After the sulfur has been thoroughly melted by the application of the steam and hot water, the hot water pipe 28 is closed and the steam branch pipe 30 is opened and the valve 46 is adjusted so as to open the fitting 40 to permit the melted sulfur to flow therethrough and through the pipe 48 to the refining chamber 49. In passing, it will be noted that inasmuch as the said connecting pipe is normally in open communication with the steam chamber 41, said pipe will be maintained hot enough to prevent congealing or freezing of the melted sulfur passing therethrough.

After the melted sulfur has been withdrawn from the separator 25 the door 32 may be opened by releasing the latch 35 so as to permit the ore rock to fall out of the separator chamber onto a car or other device for conveying the same away from the apparatus.

I claim as my invention:

1. The process of extracting sulfur from ore which comprises the steps of subjecting the ore mass to heat to melt the sulfur, allowing the ore mass to cool, washing the mud from the cooled ore mass, and thereafter recovering the sulfur.

2. The process of extracting sulfur from ore which comprises the steps of subjecting the ore mass to heat to melt the sulfur, allowing the ore mass to cool, washing the mud from the cooled ore mass, reheating the residual ore mass to liquefy the sulfur, and finally recovering the sulfur from the ore rock.

3. The process of extracting sulfur from ore which comprises the steps of subjecting the ore mass to moisture and heat to melt the sulfur, allowing the ore mass to cool, washing the mud from the cooled ore mass, and thereafter recovering the sulfur.

4. The process of extracting sulfur from ore which comprises the steps of heating the ore mass in the presence of a liquid at a temperature higher than the melting point of sulfur, allowing the ore mass to cool, washing the mud from the cooled ore mass, and thereafter recovering the sulfur.

5. The process of extracting sulfur from ore which comprises the steps of heating the ore mass in the presence of a liquid at a temperature higher than the melting point of sulfur, agitating the ore mass in the presence of the heated liquid, allowing the ore mass to cool, washing the mud from the cooled ore mass, and thereafter recovering the sulfur.

6. The process of extracting sulfur from ore which comprises the steps of agitating the ore mass in the presence of a liquid at a temperature higher than the melting point of the sulfur, allowing the ore mass to cool, washing the mud from the liquid ore mass, reheating the residual ore mass to liquefy the sulfur, and finally recovering the sulfur from the ore rock.

7. The process of extracting sulfur from ore which comprises the steps of agitating the ore mass in the presence of water and steam under pressure and at a maintained temperature higher than that of the melting point of sulfur, allowing the ore mass to cool below the melting point of the sulfur, washing the mud from the ore mass at atmospheric pressure, and thereafter recovering the sulfur from the ore rock.

8. The process of extracting sulfur from ore which comprises the steps of forcing water under greater than atmospheric pressure into the ore mass and at a temperature higher than that of the melting point of sulfur, allowing the ore mass to cool below the melting point of the sulfur, subjecting the cooled ore mass to a flow of washing water at atmospheric pressure, and finally recovering the sulfur from the residual ore mass.

9. The process of extracting sulfur from ore which comprises the steps of forcing water under greater than atmospheric pressure into the ore mass and at a temperature higher than that of the melting point of sulfur, allowing the ore mass to cool below the melting point of the sulfur, subjecting the cooled ore mass to a flow of washing water at atmospheric pressure, reheating the residual ore mass to melt the sulfur, and thereafter recovering the molten sulfur from the ore rock.

10. The process of extracting sulfur from ore which comprises the steps of subjecting the ore mass in a closed container to water under pressure, heated to a temperature greater than that of the melting point of sulfur, agitating the ore mass in the presence of the heated water, allowing the ore mass to cool below the melting temperature of sulfur, flushing the ore mass under atmospheric pressure with wash water, and thereafter recovering the sulfur from the residual ore mass.

11. The process of extracting sulfur from ore which comprises the steps of subjecting the ore mass in a closed container to water under pressure heated to a temperature greater than that of the melting point of sulfur, agitating the ore mass in the presence of the heated water, allowing the ore mass to cool below the melting temperature of sulfur, flushing the cooled ore mass under atmospheric pressure with wash water, removing the resultant ore mass from said container and transferring it to a separating chamber, and finally recovering the sulfur from the ore rock in said separating chamber.

12. The process of extracting sulfur from ore which comprises the steps of subjecting the ore mass in a closed container to water under pressure heated to a temperature greater than that of the melting point of sulfur, agitating the ore mass in the presence of the heated water, allowing the ore mass to cool below the melting temperature of sulfur, flushing the ore mass under atmospheric pressure with relatively cool washing water, removing the resultant ore mass from said container and transferring it to a separating chamber, reheating the residual ore mass in said second chamber to liquefy the sulfur, and finally separating the liquefied sulfur from the ore rock.

13. The process of extracting sulfur from ore which comprises the successive steps of heating the ore mass to liquefy it, washing the ore mass at a temperature below the melting point of the sulfur, and finally recovering the sulfur from the residual ore mass.

In testimony that I claim the foregoing as my invention I affix my signature this 23rd day of May A. D. 1919.

JESSE COFFEEN.